Patented Dec. 7, 1948

2,455,613

UNITED STATES PATENT OFFICE 2,455,613

COMPOSITIONS COMPRISING A POLYVINYL CHLORIDE RESIN STABILIZED WITH THE DIALKYL TIN SALTS OF ORTHO-SULFO-BENZIMIDE

Russell H. Schlattman, Richmond Heights, Mo., assignor to Monsanto Chemical Company, St. Louis, Mo., a corporation of Delaware No Drawing. Application July 19, 1947, Serial No. 762,209

6 Claims. (Cl. 260—88)

This invention relates to improved compositions containing predominantly polymerized vinyl chloride. More particularly, this invention relates to plasticized compositions having improved heat stability and containing polymerized vinyl chloride, vinyl chloride copolymers, or combinations thereof, collectively and broadly herein referred to in the description and claims as "polyvinyl chloride compositions."

Polyvinyl chloride compositions have found many useful applications because of their wide range of elastomeric and mechanical properties coupled with their extreme resistance to oxidation, organic solvents, acids and alkalies. Typical of such applications are calendered films and sheeting for wearing apparel, shower curtains and seat and cushion coverings, extruded insulation for electrical wiring and injection molded rigid articles such as bottle caps, drawing instruments and floor coverings.

The processing techniques necessary for the fabrication of many of these articles from polyvinyl chloride compositions often require that the compositions be exposed to elevated temperatures for extended periods of time. The time and temperature of such exposures may vary from 10 minutes to 1 hour and temperatures of 130° C. to 160° C. It has been found, however, that under the more extreme conditions of time and temperature many of the polyvinyl chloride compositions tend to deteriorate, resulting in darkening or discoloration. In many applications such deterioration is undesirable as accurate color control is quite difficult to maintain and articles of inferior or undesired coloration result. The evaluation of this tendency of a polyvinyl chloride composition to discolor on prolonged exposure to heat or elevated temperatures is commonly referred to by those skilled in the art as the composition's heat stability.

An object of this invention is to provide new compositions, particularly plasticized compositions, containing predominantly polyvinyl chloride and having improved heat stability. A further object is to provide a method for improving the heat stability of compositions containing predominantly polyvinyl chloride. Other objects of this invention will be apparent to those skilled in the art from the following description, examples and claims.

I have found that the heat stability of compositions containing predominantly polyvinyl chloride may be increased and the amount of discoloration of such compositions, when exposed to prolonged heating, may be substantially reduced by incorporating into the polyvinyl chloride composition minor amounts of a dialkyl tin salt of ortho-sulfobenzimide wherein each of the alkyl substituents contain at least 1 and not more than 8 carbon atoms.

While I perfer to use either the dipropyl tin salt of ortho-sulfobenzimide, the dibutyl tin salt of ortho-sulfobenzimide or the dioctyl tin salt of ortho-sulfobenzimide in amounts of the order of 0.5% to 5% of the finished composition, all of the dialkyl tin salts of ortho-sulfobenzimide compounds described may be advantageously used as heat stabilizers for polyvinyl chloride compositions and the amount of the dialkyl tin salt of ortho-sulfobenzimide incorporated into this composition may be increased to 10% with desirable heat stabilizing results.

In order to test the desirability and utility of the above-mentioned compounds as heat stabilizers for polyvinyl chloride compositions, a composition was prepared containing 58 parts by weight of a polyvinyl chloride resin formed by the polymerization of vinyl chloride, 40 parts of 2-ethylhexyl diphenyl phosphate plasticizer and 2 parts of the dibutyl tin salt of ortho-sulfobenzimide. The said resin, plasticizer and stabilizer were intimately mixed and fluxed on a differential speed roll mill for 5 minutes at 160° C. When a homogeneous composition had formed on the roll, the plasticized polyvinyl chloride composition was sheeted off the roll mill. As a control, a second composition was prepared, in the same manner, containing 60 parts by weight of the same type of polyvinyl chloride resin, 40 parts by weight of 2-ethylhexyl diphenyl phosphate plasticizer but no heat stabilizer was added to the control composition.

Specimens of each of these compositions were then placed in a mold 2" x 2" x 0.040" and subjected to a pressure of 2,000 pounds per square inch and a temperature of 160° C. After being maintained at this pressure and temperature for 30 minutes the specimens were removed from the molds and the amount of discoloration in each sample observed. The control which contained no thermal stabilizer had become a dark red brown in color and of very low transparency. On the other hand, the sample that contained the dibutyl tin salt of ortho-sulfobenzimide thermal stabilizer showed very litle discoloration, resulting in a highly transparent sheet with only a faint tannish discoloration.

A third composition was prepared containing 60 parts by weight of a polyvinyl chloride resin formed by the polymerization of vinyl chloride, 36 parts by weight of 2-ethylhexyl diphenyl phosphate plasticizer and 4 parts by weight of the dioctyl tin salt of ortho-sulfobenzimide. This composition was rolled, fluxed, sheeted and molded as in the first example. After heating for 30 minutes at 325° F., this third composition was removed from the mold and evaluated for its heat stability. This third composition had greatly improved heat stability characteristics in that the sample had only the faintest touch of tannish discoloration and was of high transparency.

The fourth composition contained 60 parts by weight of a polymerized vinyl chloride resin, 37 parts by weight of tricresyl phosphate and 3 parts by weight of the dipropyl tin salt of orthosulfobenzimide. This fourth composition was rolled, fluxed, sheeted and molded as in the first example and was removed from the mold after heating for 30 minutes at 325° F. While this sample had a very slight tannish discoloration, the heat stability of this composition was remarkably improved, as those skilled in the art are familiar with the fact that polyvinyl chloride resins plasticized with tricresyl phosphate are of the more difficult compositions to stabilize against deterioration at increased temperatures of processing.

The compositions of this invention may also contain carbon black, zinc oxide, clay, wood flour, and other pigments and fillers commonly used in the plastics industry. The stabilizing effect of the thermal stabilizers of this invention are realized in unplasticized compositions as well as compositions that are plasticized with many of the other common plasticizers used in the plastic industry, such as dioctyl phthalate and tricresyl phosphate.

Many compounds and compositions have been disclosed in the prior art as heat stabilizers for polyvinyl chloride compositions. These various heat stabilizing compounds have been incorporated into compositions containing polyvinyl chloride to retard or prevent the initial discoloration or darkening which results from the processing of polyvinyl chloride compositions at elevated temperatures. The more successful of these prior art heat stabilizers are illustrated by maleic anhydride and the compounds described in the prior art as "basic heat stabilizers." The use of maleic anhydride and these basic heat stabilizers, such as basic lead silicate, basic lead carbonate and basic lead acetate, has resulted in compositions having improved heat stability characteristics, but the degree of thermal stability to be achieved by the use of these basic heat stabilizers is not wholly satisfactory, particularly when the time of processing must be of the order of 30 minutes to 1 hour at temperatures of the order of 160° C. rather than relatively short processing times of the order of 5 to 15 minutes. However, I have found that by the use of the dialkyl tin salts of ortho-sulfobenzimide in cooperation with the basic heat stabilizers, there is a synergistic heat stabilizing action of the basic heat stabilizers and the dialkyl tin salts of ortho-sulfobenzimide resulting in compositions having thermal stabilities of improved proportions that cannot be achieved by the use of the basic heat stabilizers alone without the cooperation and synergistic heat stabilizing action of the dialkyl tin salts of ortho-sulfobenzimide.

A fifth composition was prepared by intimately mixing 56 parts by weight of a polyvinyl chloride resin with 40 parts by weight of 2-ethylhexyl diphenyl phosphate plasticizer, 2 parts by weight of basic lead silicate and 2 parts by weight of the dibutyl tin salt of ortho-sulfobenzimide. This composition was rolled, fluxed, sheeted and molded in the same manner as is described in the first example. After heating the composition in the mold for 30 minutes at 325° F., the sample was inspected for discoloration. The sample possessed excellent heat stability characteristics in that the sample was quite flexible, supple and there was no indication of any discoloration.

This synergistic heat stabilizing action of the dialkyl tin salts of the ortho-sulfobenzimide in polyvinyl chloride compositions has also been noted in the use of the dialkyl tin salts of ortho-sulfobenzimide with other heat stabilizers which have been described in the prior art, such as maleic anhydride.

A sixth composition was prepared by intimately mixing 56 parts by weight of a polyvinyl chloride resin with 40 parts by weight of 2-ethylhexyl diphenyl phosphate plasticizer, 2 parts by weight of maleic anhydride and 2 parts by weight of the dibutyl salt of ortho-sulfobenzimide. This composition was rolled, fluxed, sheeted and molded in the same manner as is described in the first example. After heating the composition in the mold for 30 minutes at 325° F., the sample was inspected for discoloration. The sample possessed excellent heat stability characteristics in that the sample was quite flexible, supple and there was no indication of any discoloration.

Though particular reference has been made to compositions of polyvinyl chloride resins, the dialkyl tin salts of ortho-sulfobenzimide may be very desirably used to heat stabilize compositions containing resins that are formed through the conjoint polymerization of mixtures of monomers that are predominantly vinyl chloride, such as mixtures of vinyl chloride and varying amounts of vinyl esters of carboxylic acids. These copolymers containing predominantly vinyl chloride are exemplified by copolymers containing 95 to 85% by weight of vinyl chloride and 5 to 15% by weight of vinyl acetate, vinylidine chloride, diethyl maleate or methyl methacrylate.

Though I have herein set forth specific embodiments of my invention, it is not my intention to be limited wholly thereto. For to those skilled in the art there are many apparent variations and modifications such as the variations of quantities used and a substitution of equivalent materials that do not depart from the scope of my invention as set forth in the following claims.

I claim:

1. A polymerized vinyl chloride composition characterized by improved heat stability and being comprised of a polymerized vinyl resin containing at least 85% of combined vinyl chloride and from 0.5 to 10% by weight of a dialkyl tin salt of ortho-sulfobenzimide wherein each of the alkyl substituents has at least 1 and not more than 8 carbon atoms.

2. A polymerized vinyl chloride composition characterized by improved heat stability and being comprised of a polymerized vinyl resin containing at least 85% of combined vinyl chloride and from 0.5 to 10% by weight of the dibutyl tin salt of ortho-sulfobenzimide.

3. A plasticized polymerized vinyl chloride composition characterized by improved heat stability and being comprised of a polymerized vinyl resin containing at least 85% of combined vinyl chloride, a plasticizer and from 0.5 to 10% by weight of a dialkyl tin salt of ortho-sulfobenzimide wherein each of the alkyl substituents has at least 1 and not more than 8 carbon atoms.

4. A plasticized polymerized vinyl chloride composition characterized by improved heat stability and being comprised of a polymerized vinyl resin containing at least 85% of combined vinyl chloride, a plasticizer and from 0.5 to 10% by weight of the dibutyl tin salt of ortho-sulfobenzimide.

5. A plasticized polymerized vinyl chloride composition characterized by improved heat stability and being comprised of a polymerized vinyl resin containing at least 85% of combined vinyl chloride, a plasticizer, from 0.5 to 10% by weight of a basic lead salt heat stabilizer and from 0.5 to 10% by weight of a dialkyl tin salt of ortho-sulfobenzimide wherein each of the alkyl substituents has at least one and not more than eight carbon atoms.

6. A plasticized polymerized vinyl chloride composition characterized by improved heat stability and being comprised of a polymerized vinyl resin containing at least 85% of combined vinyl chloride, a plasticizer, from 0.5 to 10% by weight of a basic lead salt heat stabilizer and from 0.5 to 10% by weight of the dibutyl tin salt of ortho-sulfobenzimide.

RUSSELL H. SCHLATTMAN.

REFERENCES CITED

The following references are of record in the file of this patent:

UNITED STATES PATENTS

| Number | Name | Date |
|---|---|---|
| 2,319,953 | Scott | May 25, 1943 |
| 2,319,954 | Scott | May 25, 1943 |